April 14, 1953 L. H. SOMMER 2,635,108
KETOSILANES
Filed Jan. 3, 1951
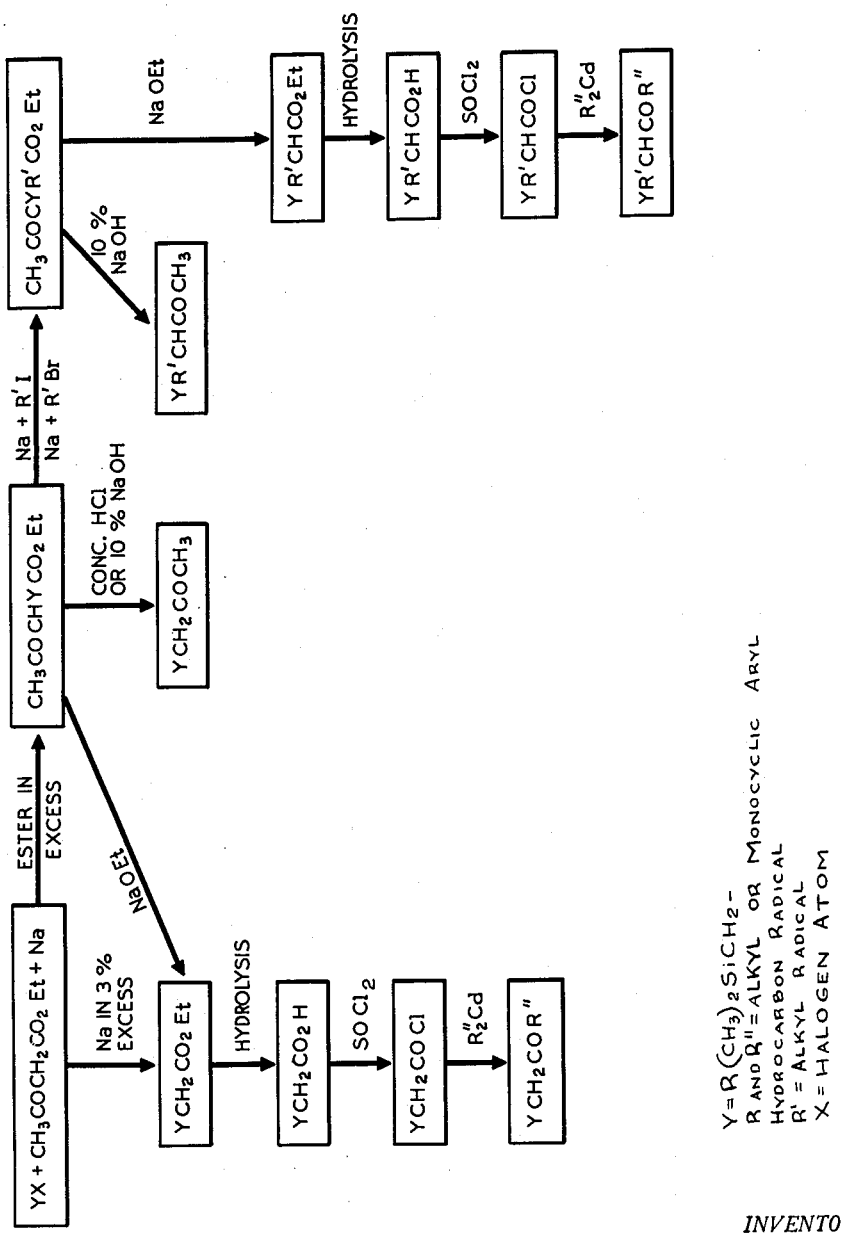
INVENTOR.
LEO H. SOMMER
BY Robert F. Fleming Jr
ATTORNEY Patented Apr. 14, 1953

2,635,108

UNITED STATES PATENT OFFICE 2,635,108

KETOSILANES

Leo H. Sommer, Cambridge, Mass., assignor to Dow Corning Corporation, Midland, Mich., a corporation of Michigan Application January 3, 1951, Serial No. 204,273

7 Claims. (Cl. 260—448.2)

1

This invention relates to ketosilanes wherein the oxygen is attached to a carbon atom gamma to the silicon.

It is an object of this invention to prepare novel silanes which are intermediates in the preparation of siloxanes and which are excellent solvents.

This invention relates to compounds of the formula R″COCHR′CH$_2$Si(CH$_3$)$_2$R in which R″ is alkyl or monocyclic aryl hydrocarbon, R′ is alkyl or hydrogen, and R is alkyl or monocyclic aryl hydrocarbon.

The above type compounds are prepared, generally, by reacting silanes of the type R(CH$_3$)$_2$SiCH$_2$X where X is halogen with the sodium salt of acetoacetic ester in ethanol in accordance with the conditions normally employed in organic synthesis. The product obtained by this reaction will vary, depending upon whether an excess of sodium or an excess of acetoacetic ester is employed. The various reactions involved are shown in the drawing.

The drawing is a flow sheet showing the various reactions involved in the preparation of the compounds of this invention. In the drawing the various symbols have the following meaning:

Y is the radical 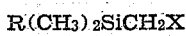.
R is an alkyl or monocyclic aryl hydrocarbon radical.
R′ is an alkyl radical.
R″ is an alkyl or monocyclic aryl hydrocarbon radical.
X is a halogen atom.

From the above drawing it can be seen that the synthesis of the ketosilanes depends upon the formation of a triorganosilyl substituted acetoacetic ester. This compound may then be reacted with an alkyl halide to introduce an alkyl substituent.

The formation of the ketones from the substituted acetoacetic esters either with or without alkyl side chains, may be accomplished by cleaving them with concentrated HCl or a dilute alkali metal hydroxide solution. In such event the ester group is cleaved to produce a substituted ketone. Only those ketones in which R″ is methyl may be prepared by this method.

Alternatively, the substituted acetoacetic esters may be treated with sodium ethylate, in which event cleavage of the keto group takes place to produce a substituted ester. This ester is then hydrolyzed to a carboxylic acid which in turn is converted to an acyl chloride by treatment with thionyl chloride. The acyl chloride is then converted to a ketone by treatment with a cadmium compound. By this method ketones in which R″ is any alkyl or monocyclic aryl radical can be prepared. Thus, a greater variety of products may be synthesized by the second method than by the first. It is to be noted that the use of excess sodium in the primary synthesis means that sodium ethylate is present, and hence the substitution of the acetoacetic ester and its cleavage occur in one operation.

The ketones of this invention undergo normal ketone reactions with such reagents as alkyl magnesium halides. For example, when 4-trimethylsilyl-2-butanone

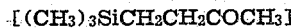

is treated with methyl magnesium bromide in ether and the resulting product is hydrolyzed, 4 - trimethylsilyl - 2 - methyl - 2 - butanol,

is produced. This tertiary alcohol is readily converted into corresponding chloride 4 - trimethylsilyl-2-methyl-2-chlorobutane,

by treatment of the alcohol with concentrated HCl at room temperature. The ketones of this invention may also be reacted with NaOBr to give the corresponding carboxylic acid.

Compounds which are within the scope of this invention are those in which R is any alkyl or monocyclic aryl hydrocarbon radical, R′ is any alkyl radical or hydrogen, and R″ is any alkyl or monocyclic aryl hydrocarbon radical. In those cases where it is desired to prepare siloxanes from the ketosilanes of this invention, it is preferable that R be methyl or phenyl.

The compounds of this invention are useful as solvents and in some instances as intermediates in the preparation of siloxanes. These compounds also serve as valuable additives for conventional siloxanes.

The following examples are illustrative only and are not to be construed as limiting the invention, the scope of which is properly delineated in the appended claims.

Example 1

In a two-liter, three-neck flask equipped with a stirrer, dropping funnel, and reflux condenser, sodium ethylate was prepared by the addition of 30 grams of sodium to 1 liter of absolute ethanol. To this was added during 15 minutes 170 grams of ethyl acetoacetate, followed by the addition during 30 minutes of 300 grams of iodomethyltrimethylsilane. The solution was stirred and heated at reflux temperature for 30 minutes. The reaction components, boiling from 70° to 78° C., were removed by distillation and the residue was treated with water. The organic layer was separated and the aqueous layer was extracted with three 300 cc. portions of ethyl ether. After drying over anhydrous sodium sulfate, the solvent was removed and the product was fractionated to give a 48% yield of ethyl-α-trimethylsilylmethylacetoacetate.

In a three-neck flask equipped with a stirrer and a reflux condenser there was placed 24 grams of ethyl-α-trimethylsilylmethylacetoacetate, 80 cc. of concentrated HCl, and 80 cc. of ethanol. The reaction mixture was stirred and heated at 90° C. for four hours. Ether was then added and the mixture was saturated with sodium chloride. After extraction of the aqueous layer with three 300 cc. portions of ether the combined organic layers were dried over sodium sulfate. Distillation of the organic layer gave a 59% yield of 4-trimethylsilyl-2-butanone $$[(CH_3)_3SiCH_2CH_2COCH_3]$$

This compound boils at 84° C. at 65 mm. and was found to have the following properties: $n_D^{20}$ 1.4228, $d^{20}$ .833, and molar refraction of 44.

Example 2

50 grams of ethyl-α-trimethylsilylmethylacetoacetate was added to a solution of 14.7 grams of sodium ethylate in 300 cc. of ethanol over a period of 15 minutes. 40 grams of methyliodide was added to the mixture with stirring and thereafter the reaction mixture was refluxed for 30 minutes. Most of the ethanol was removed by distillation and the residue was then treated with water. The organic layer was separated and the aqueous layer extracted with three 300 cc. portions of ether. After drying over anhydrous sodium sulfate and distillation, there was obtained in 72.4% yield the compound ethyl-α-methyl-α-trimethylsilylmethylacetoacetate.

This compound was then refluxed with a 10% aqueous solution of sodium hydroxide. After separation of the organic layer and distilling, there was obtained in 53% yield the compound 4-trimethylsilyl-3-methyl-2-butanone $$[(CH_3)_3SiCH_2CH(CH_3)COCH_3]$$

This compound has the following properties: boiling point 83° C. at 40 mm., $n_D^{20}$ 1.4280, $d^{20}$ .836, and molar refraction 48.7.

Example 3

The compound 3-trimethylsilylmethyl-2-pentanone $$[(CH_3)_3SiCH_2CH(C_2H_5)COCH_3]$$

was prepared by the method of Example 2 except that ethyl bromide was employed in the place of methyl iodide. The compound has the following properties: boiling point 88° C. at 30 mm., $n_D^{20}$ 1.4295, $d^{20}$ .843, and molar refraction 52.8.

Example 4

500 grams of iodomethyltrimethylsilane was added with stirring and refluxing during three minutes to sodioacetoacetic ester. The latter had been prepared by reacting 296 grams of acetoacetic ester with a 3% excess of sodium ethylate in one liter of ethanol. The reaction mixture was heated at the reflux point for 14 hours. After cooling, the reaction product was neutralized with 15 cc. of glacial acid. The product was distilled to remove low boiling fractions and there was obtained ethyl acetate and unreacted iodomethyltrimethylsilane. The ethyl acetate resulted from the keto cleavage of the acetoacetic ester.

The product remaining after the removal of low boiling fractions was treated with water and the organic layer was separated and the aqueous layer was extracted with three 300 cc. portions of ether. The combined organic layers were dried over anhydrous sodium sulfate and fractionated to give 250 grams of ethyl-β-trimethylsilylpropionate.

A mixture of 246 grams of ethyl-β-trimethylsilylpropionate and 100 cc. of 10% sodium hydroxide solution were stirred and heated at 90° C. for two hours. After cooling, the solution was acidified with concentrated hydrochloric acid and the upper layer was separated. After drying over sodium sulfate, fractionation of the product gave β-trimethylsilylpropionic acid.

40 grams of β-trimethylsilylpropionic acid was heated with 50.4 grams of thionyl chloride for one hour at 90° C. A distillation of the product gave β-trimethylsilylproponyl chloride in 89% yield.

Diphenylcadmium was prepared by adding at 0° C. over a period of five minutes, 30 grams of cadmium chloride to an ether solution of phenylmagnesiumbromide. After removal of the major proportion of the ether by distillation, 300 cc. of benzene was added and an additional portion of ether was removed by heating on the steam bath. While heating the reaction flask on the steam bath there was added 21.5 grams of β-dimethylsilylproponyl chloride over a period of five minutes. After heating for an additional twenty minutes, the reaction product was poured onto a mixture of HCl and ice. The organic layer was then separated and the aqueous layer extracted with two 100 cc. portions of benzene. The combined organic layers were washed with water, 5% sodium carbonate solution, and finally with water. After drying over sodium sulfate and distilling, 10 grams of 3-trimethylsilyl-1-phenyl-1-propanone [$(CH_3)_3SiCH_2CH_2COC_6H_5$] was obtained. This compound has the following properties: boiling point 115° C. at 4 mm., $n_D^{20}$ 1.5085, $d^{20}$ .955, and molar refraction 64.4.

Example 5

β-phenyldimethylsilylpropionic acid was prepared in the manner of Example 4, starting with phenyldimethyliodomethylsilane, acetoacetic ester, and sodium.

24 grams of β-phenyldimethylsilylpropionic acid was heated with 58 grams of thionyl chloride at 90° C. for two hours. Fractionation of the product gave β-phenyldimethylsilylpropionyl chloride.

Dimethylcadmium was prepared by reacting methylmagnesium bromide in ether solution with cadmium chloride. The reaction was carried out at a temperature of 0° C. and the cadmium chloride was added over a period of five minutes. Most of the ether was removed and benzene was added. The dimethylcadmium solution was heated on a steam bath as 12.5 grams of phenyldimethylsilylpropionyl chloride was added. The reaction mixture was then stirred and heated for one hour at 80° C. It was cooled and poured into ice water and the organic layer was separated. The aqueous layer was extracted with two 200 cc.

portions of benzene and the combined layers were washed with aqueous potassium carbonate and then with water. Upon fractionation there was obtained a 45% yield of 4-phenyldimethylsilyl-2-butanone, $C_6H_5(CH_3)_2SiCH_2CH_2COCH_3$. This compound had the following properties: boiling point 109° C. at 4 mm., $n_D^{20}$ 1.5065, $d^{20}$ .963, and molar refraction 63.7.

That which is claimed is:

1. A compound of the formula

R″COCHR′CH$_2$Si(CH$_3$)$_2$R in which R and R″, respectively, are selected from the group consisting of alkyl and monocyclic aryl hydrocarbon radicals, and R′ is selected from the group consisting of alkyl radicals and hydrogen.
2. $(CH_3)_3SiCH_2CH_2COCH_3$.
3. $(CH_3)_3SiCH_2CH(CH_3)COCH_3$.
4. $(CH_3)_3SiCH_2CH_2COC_6H_5$.
5. $C_6H_5(CH_3)_2SiCH_2CH_2COCH_3$.
6. A method of producing ketosilanes which comprises reacting an ester of the formula $CH_3COCR'[CH_2Si(CH_3)_2R]CO_2Et$ with a reagent selected from the group consisting of concentrated HCl and dilute aqueous alkali metal hydroxide solution whereby the CO$_2$Et group is cleaved to produce a ketone of the formula $R(CH_3)_2SiCH_2CHR'COCH_3$ where R in both compounds is selected from the group consisting of alkyl and monocyclic aryl hydrocarbon radicals and R′ is selected from the group consisting of alkyl radicals and hydrogen.
7. $(CH_3)_3SiCH_2CH(C_2H_5)COCH_3$.

LEO H. SOMMER.

References Cited in the file of this patent

Sommer et al., Jour. Am. Chem. Soc., vol. 72, (May 1950) pp. 1935–1939.